United States Patent Office 2,730,521
Patented Jan. 10, 1956

2,730,521

CHROMIUM CONTAINING MONOAZO DYESTUFFS

Guido Schetty and Hans Ackermann, Basel, Switzerland, assignors to J. R. Geigy A. G., Basel, Switzerland, a Swiss firm No Drawing. Application August 24, 1953, Serial No. 376,238

Claims priority, application Switzerland September 10, 1952

6 Claims. (Cl. 260—146)

Complex chromium compounds of certain metallisable monoazo dyestuffs which contain no acid water solubilising groups are very well suited for the fast dyeing of wool and fibres similar thereto. Although yellow, orange, red, brown, violet and grey chromium containing dyestuffs can be relatively easily obtained technically, it is somewhat more difficult to obtain blue dyestuffs which dye in comparatively pure shades. The present invention is concerned with the production of such blue chromium containing dyestuffs which contain no acid water solubilising groups and which dye wool and synthetic polpeptide fibres similar thereto from a neutral to weakly acid dyebath in relatively pure blue shades. The dyeings have a good colour in artificial light and very good fastness properties.

It has been found that new blue chromium-containing monoazo dyestuffs are obtained if monoazo dyestuffs which contain no acid water solubilising groups, corresponding to formula I, are treated with agents giving off chromium in such amounts that there is at least 1 chromium atom in complex linkage with two dyestuff molecules.

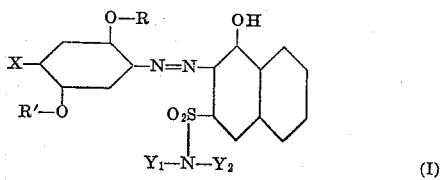

(I)

In this formula R and R' represent low molecular unsubstituted or substituted alkyl groups, preferably hydroxyl substituted alkyl groups, wherein the hydroxyl group can also be modified, X represents hydrogen or a non-ionogenic substituent such as halogen, $Y_1$ represents hydrogen, an alkyl, oxalkyl, cycloalkyl or a phenyl group and $Y_2$ represents hydrogen or an alkyl group whereby alkyl groups corresponding to $Y_1$ and $Y_2$ can be bound together in the form of a ring either by themselves or with oxygen.

The complex chromium compounds correspond to the type $(D-M_1-D)M_2$. In this formula D represents the monoazo dyestuff according to the present invention, $M_1$ represents a complexly bound chromium atom and $M_2$ represents the equivalent of a cation, in particular that of an alkali metal or ammonium.

2.5-dialkoxy- and 2.5-bis-oxalkoxy-1-aminobenzene compounds which if desired can be non-ionogenically substituted in the 4-position, e. g. by halogen, are particularly suitable as diazo components for the production of the dyestuffs usable according to the present invention. Diazo compounds with substituted alkyl radicals R and R' can be produced for example from 1.4-dihydroxybenzenes by oxalkylation of the hydroxyl groups, mononitration, if desired modification of the hydroxyl groups by alkylation or esterification, and by reduction of the nitro to the amino group.

Coupling components which can be used are obtained from 1-hydroxynaphthalene-3-sulphonic acid by acylation of the hydroxyl group, modification of the sulphonic acid into the sulphonic acid halide group in the usual way, reaction with an excess of ammonia or of primary aliphatic, alicyclic, aromatic or hydrogenated heterocyclic amines or with secondary aliphatic or araliphatic amines and saponification of the acyloxy group standing in the 1-position to the hydroxyl group. Organic amino compounds which can be used in this process are, e. g. methyl-, ethyl-, propyl-, butyl-amine, aminoethanol, cyclohexyl-amine, aniline, toluidines, xylidines, anisidines, phenetidines, piperidine, morpholine, dimethyl- or diethyl-amine and monomethyl- or monoethyl-aniline. It is of advantage to perform the coupling process in an alkaline medium.

The salts of trivalent chromium are suitable as chroming agent; if desired the complex compounds thereof are also suitable e. g. chromic sulphate, chromic formiate, chromic acetate and, in certain conditions also the alkali salts of chromosalicylic acid. The splitting off of the alkyl radical R during the chroming process is facilitated by the action of the agents giving off chromium. It is advantageous to work at temperatures of over 100° C. in an aqueous solution or suspension under pressure, preferably in the presence of wetting and dispersing agents such as turkey red oil at 120–160° C. Chroming can also be performed in alcohol under pressure or in higher boiling organic solvents and diluents in an open vessel, e. g. in ethylene glycol, in ethylene glycol monomethyl- or monoethyl-ether, in formamide, in acetamide or also in the urea melt at 135–155° C.

The new complex chromium compounds are obtained as dark blue to grey-black powders which dissolve in hot water with a blue and in concentrated sulphuric acid with a violet colour. If necessary their water solubility can be further improved by mixing with small amounts of salts having an alkaline reaction such as sodium carbonate or trisodium phosphate or with anion active wetting and dispersing agents such as soap or synthetic washing agents. They dye wool and synthetic polypeptide fibres similar thereto such as Nylon and Perlon from a neutral to weakly acid bath in very fast, clear blue shades. The wool dyeings have good fastness to light and the nuance is good in artificial light.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

EXAMPLE 1

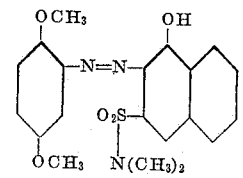

15.3 parts of 1-amino-2.5-dimethoxybenzene are dissolved in 250 parts of hot water with 35 parts of concentrated hydrochloric acid, the solution is cooled to 3° and diazotised after the addition of ice and 6.9 parts of sodium nitrite (as 33% solution). The diazonium solution is poured at 0–3° into a solution of 26.4 parts of 1-hydroxynaphthalene-3-sulphonic acid dimethylamide, 10.5 parts by volume of 10 N-caustic soda lye and 33 parts of anhydrous soda in 500 parts of water. On completion of the formation of the dyestuff, it is isolated by the addition of sodium chloride solution. The dried dyestuff is heated in 450 parts of acetamide with 16 parts of chromic acetate (corresponding to 4.6 parts of $Cr_2O_3$) at 140–145° until the starting dyestuff has completely disappeared, which is for about 1½ hours. The mixture is then diluted with 700 parts of hot water, hydrochloric acid is added until congo paper is turned a strong blue colour, the precipitated dyestuff, after being cooled, is filtered off and washed with cold water. The dyestuff is then dissolved in 15 parts by volume of 10 N-caustic soda lye and 1000 parts of hot water and precipitated at 40° by the addition of 25 parts of sodium chloride. After cooling, the chromium containing dyestuff is filtered off and dried. It is a dark blue powder which easily dissolves in hot water and dyes wool from a neutral or weakly acid bath in full, reddish-blue shades. The dyeings are very fast to light and in addition have good fastness to milling and sea water.

A similar dyestuff is obtained if instead of 1-amino-2.5-dimethoxybenzene, 18.75 parts of 1-amino-4-chloro-2.5-dimethoxybenzene are used.

EXAMPLE 2

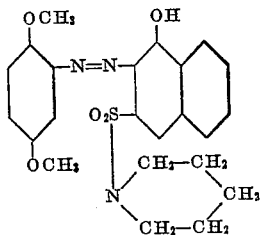

15.3 parts of 1-amino-2.5-dimethoxybenzene are diazotised as described in example 1 and the diazonium solution is poured at 0–3° into a solution of 30.6 parts of 1-hydroxynaphthalene-3-sulphonic acid piperidide, 10.5 parts by volume of 10 N-caustic soda lye and 33 parts of anhydrous soda in 500 parts of water. On completion of the formation of the dyestuff, it is isolated by the addition of sodium chloride. The dried dyestuff is then heated at 145–155° for about 4 hours in 750 parts of glycol with 27 parts of chromic acetate (corresponding to 7.6 parts of $Cr_2O_3$) and 13 parts by volume of 10 N-caustic soda lye. The solution, still hot, is poured into 2400 parts of 12% sodium chloride solution, the dyestuff which precipitates is filtered off, washed and dried. The dyestuff is obtained in the form of a grey-black powder. It dyes wool from a neutral or weakly acid bath in blue shades.

EXAMPLE 3

10 parts of wool are entered at 40° into a dyebath containing 400 parts of water, 0.2 part of the dyestuff according to example 1 and 0.3 part of ammonium acetate. The bath is boiled until the liquor is practically exhausted, which is for about 1 hour. The wool which has been dyed a full blue shade is then rinsed and dried.

The following dyestuffs can be prepared according to the information given in Examples 1 and 2:

Table

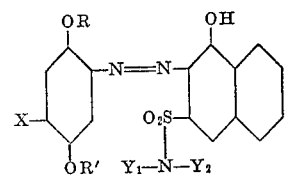

| No. | R | R' | X | $Y_1$ | $Y_2$ | Colour on wool |
|---|---|---|---|---|---|---|
| 1 | —$CH_3$ | —$CH_3$ | H | —H | —H | blue. |
| 2 | —$CH_3$ | —$CH_3$ | H | —H | —$CH_3$ | greyish blue. |
| 3 | —$CH_3$ | —$CH_3$ | H | —H | $C_6H_5$ | Do. |
| 4 | —$CH_3$ | —$CH_3$ | H | —$C_2H_5$ | —$C_2H_5$ | blue. |
| 5 | —$C_2H_5$ | —$C_2H_5$ | H | —$CH_3$ | —$CH_3$ | Do. |
| 6 | —$CH_2CH_2OH$ | —$CH_2CH_2OH$ | H | —$CH_3$ | —$CH_3$ | Do. |
| 7 | —$CH_3$ | —$CH_3$ | H | —H | —$CH\underset{CH_2-CH_2}{\overset{CH_2-CH_2}{<}}CH_2$ | greenish blue. |
| 8 | —$CH_3$ | —$CH_3$ | H | —$C_2H_5$ | —$C_6H_5$ | blue. |
| 9 | —$CH_3$ | —$CH_3$ | H | —$CH_2CH_3$ | —H | grey-blue. |
| 10 | —$CH_3$ | —$CH_3$ | H | —$CH_2CH_2OCH_2CH_2$— | | blue. |
| 11 | —$CH_3$ | —$CH_3$ | Cl | H | —$CH_3$ | Do. |
| 12 | —$CH_2CH_2OH$ | —$CH_2CH_2OH$ | Cl | H | —$CH\underset{CH_2-CH_2}{\overset{CH_2-CH_2}{<}}CH_2$ | greenish blue. |

It will be evident that the formula of the dyestuff of No. 10 of the table will be

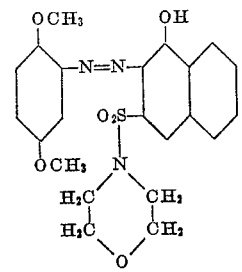

What we claim is:

1. A complex chromium compound of the general formula:

$$[D\text{—}M_1\text{—}D]M_2$$

wherein $M_1$ is a complexly bound chromium atom, $M_2$ is a cation selected from the group consisting of alkali metals and ammonium and D is a co-ordinated monoazo dyestuff of the formula:

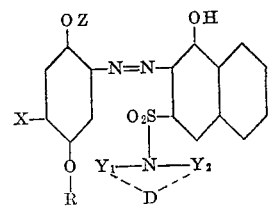

wherein R represents a member selected from the group consisting of methyl, ethyl and hydroxyethyl radicals, X represents a member selected from the group consisting of H and Cl, $Y_1$ represents a member selected from the group of hydrogen, methyl, ethyl, cyclohexyl and phenyl radicals, $Y_2$ represents a member selected from the group consisting of hydrogen and lower alkyl, Z represents a member selected from the group consisting of —$CH_3$, —$C_2H_5$ and —$CH_2CH_2OH$, and $Y_1$ and $Y_2$ may be bound together by D, D representing the atoms necessary to form together with

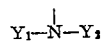

a six-membered ring selected from the group consisting of the piperidino and morpholino rings.

2. A complex chromium compound of the general formula:

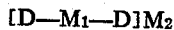

wherein $M_1$ is a complexly bound chromium atom, $M_2$ is a cation selected from the group consisting of alkali metals and ammonium and D is a co-ordinated monoazo dyestuff of the formula:

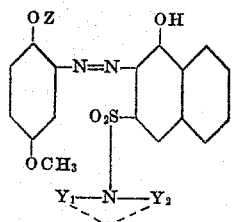

wherein $Y_1$ represents a member selected from the group of hydrogen, methyl, ethyl, cyclohexyl and phenyl radicals, $Y_2$ represents a member selected from the group consisting of hydrogen and lower alkyl, Z represents a member selected from the group consisting of —CH₃, —C₂H₅ and —CH₂CH₂OH, and $Y_1$ and $Y_2$ may be bound together by D, D representing the atoms necessary to form with

a six-membered ring selected from the group consisting of the piperidino and morpholino rings.

3. A complex chromium compound of the formula:

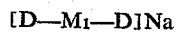

wherein $M_1$ is a complexly bound chromium atom, and D is a co-ordinated monoazo dyestuff of the formula:

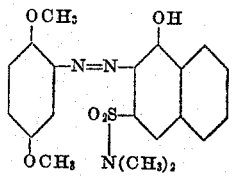

4. A complex chromium compound of the formula:

wherein $M_1$ is a complexly bound chromium atom, and D is a co-ordinated monoazo dyestuff of the formula:

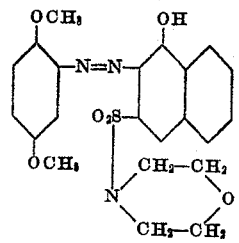

5. A complex chromium compound of the formula:

[D—M₁—D]Na wherein $M_1$ is a complexly bound chromium atom, and D is a co-ordinated monoazo dyestuff of the formula:

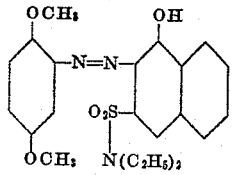

6. A complex chromium compound of the formula:

[D—M₁—D]Na wherein $M_1$ is a complexly bound chromium atom, and D represents a co-ordinated monoazo dyestuff of the formula:

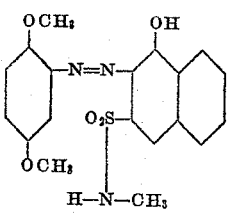

References Cited in the file of this patent
UNITED STATES PATENTS
2,599,147    Widmer et al. ---------- June 3, 1952